United States Patent [19]

Hyler et al.

[11] 4,207,692
[45] Jun. 17, 1980

[54] TWO ENGINE FOUR-WHEEL DRIVE SCRAPER WITH MAIN PROPULSION AT REAR AXLE

[75] Inventors: John H. Hyler, Peoria; Walter E. Lott, Washington; Clifford E. Johnson, Peoria, all of Ill.

[73] Assignee: Westinghouse Air Brake Company, Pittsburgh, Pa.

[21] Appl. No.: 10,695

[22] Filed: Feb. 9, 1979

[51] Int. Cl.² .............................................. E02F 3/64
[52] U.S. Cl. ...................................... 37/129; 60/711; 180/54 C
[58] Field of Search ...................... 37/4, 8, 124, 126 R, 37/127, 129; 60/711; 180/546, 56, 291, 301

[56] References Cited

U.S. PATENT DOCUMENTS

| | | | |
|---|---|---|---|
| 2,817,211 | 12/1957 | Reiners | 60/711 |
| 3,486,251 | 12/1969 | Carston | 37/129 X |
| 3,512,277 | 5/1970 | Stuller | 37/129 X |
| 3,589,401 | 6/1971 | Anderson | 37/129 |
| 3,804,191 | 4/1974 | Golan et al. | 37/124 X |
| 3,981,374 | 9/1976 | Johns, Jr. | 37/124 X |
| 4,063,361 | 12/1977 | Hyler et al. | 37/129 |

*Primary Examiner*—E. H. Eickholt

*Attorney, Agent, or Firm*—Leydig, Voit, Osann, Mayer & Holt, Ltd.

[57] ABSTRACT

An off-highway earth-moving vehicle of the scraper type which includes a tractor section and scraper section interconnected by a draft frame providing rolling rigidity, each section having a pair of ground-engaging wheels. A floating axle assembly is provided on the tractor section permitting independent movement of the tractor wheels in the following of ground contours. The scraper section is driven by a first engine having a first torque converter coupled to the scraper wheels. The tractor section is driven by a second engine having a second torque converter coupled to the tractor wheels. The sections of the vehicle are so proportioned in size and weight that the weight applied to the scraper wheels under both loaded and unloaded conditions is approximately twice the weight applied to the tractor wheels and the torque converters in the sections are so proportioned that at normal operating engine r.p.m. the power supplied to the scraper wheels is approximately twice the power supplied to the tractor wheels. This is accomplished by using torque converters having respective maximum horsepower output ratings at an input speed corresponding to normal operating engine r.p.m. which bear a ratio to one another on the general order of 2:1.

2 Claims, 13 Drawing Figures

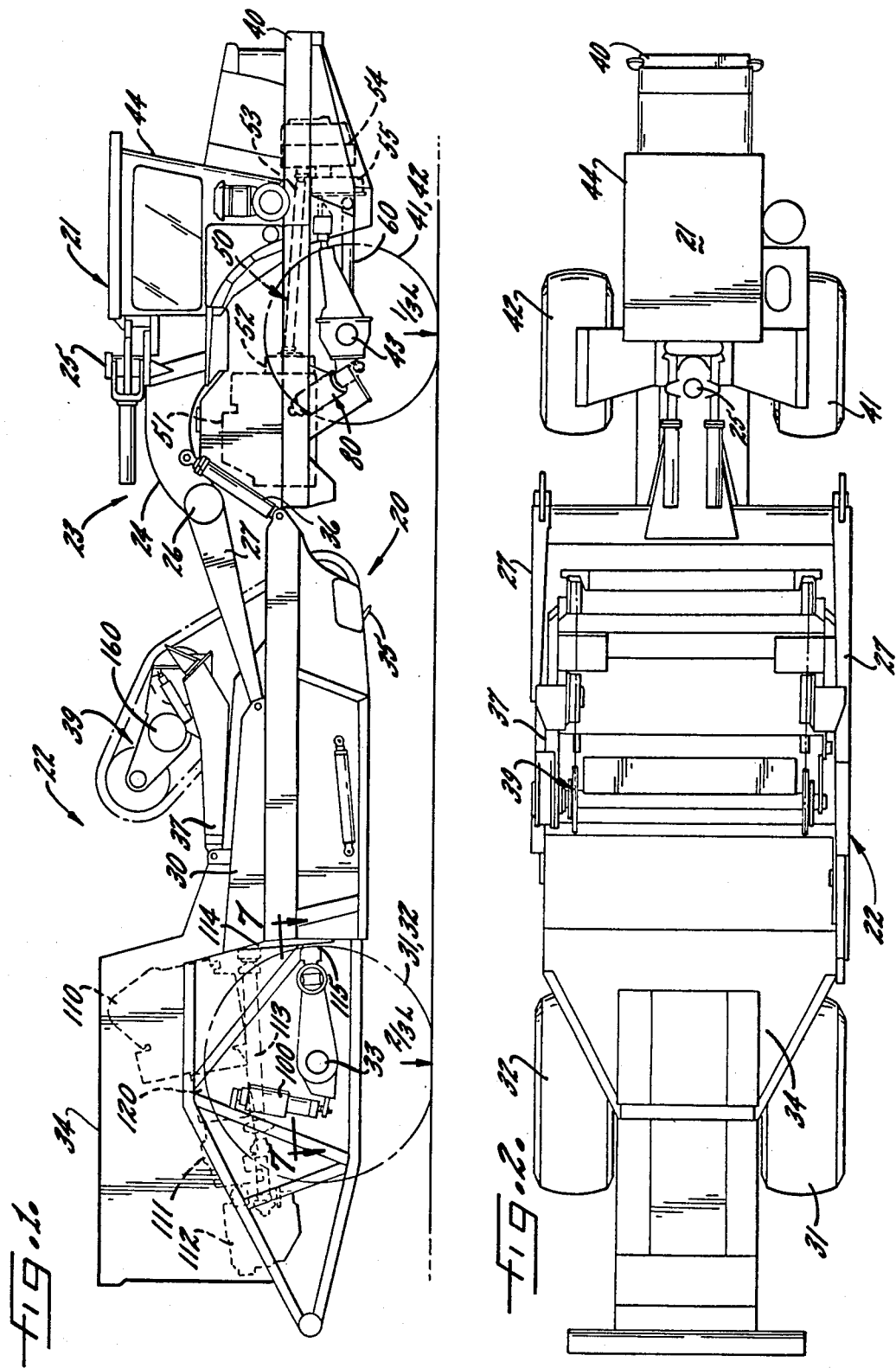

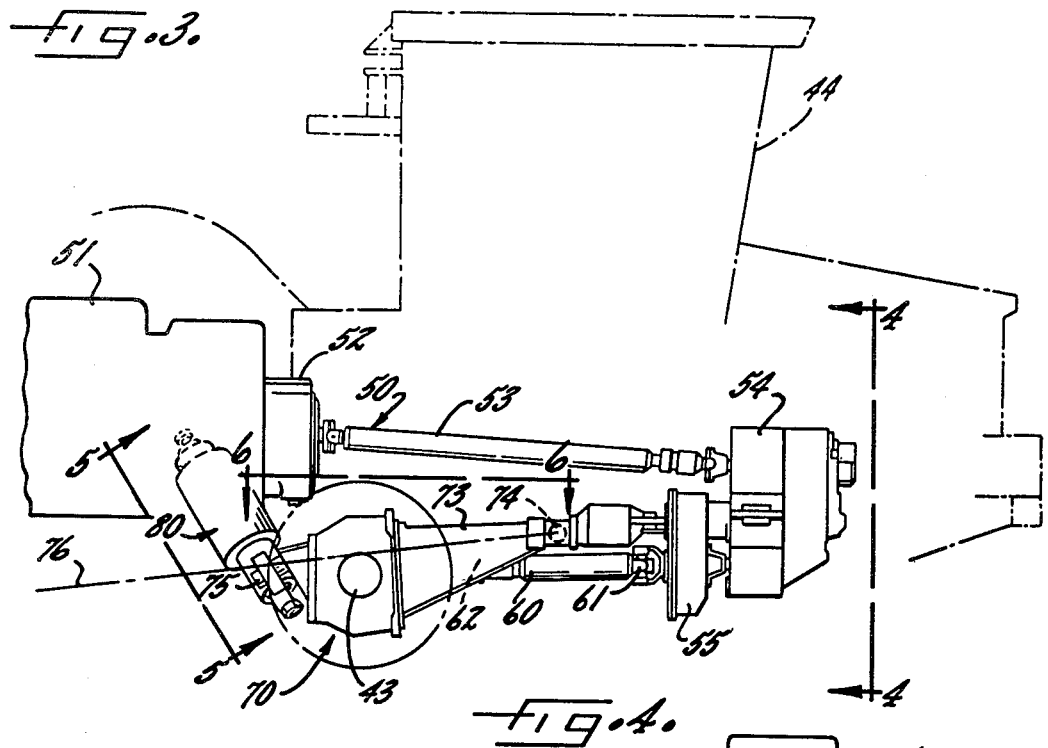
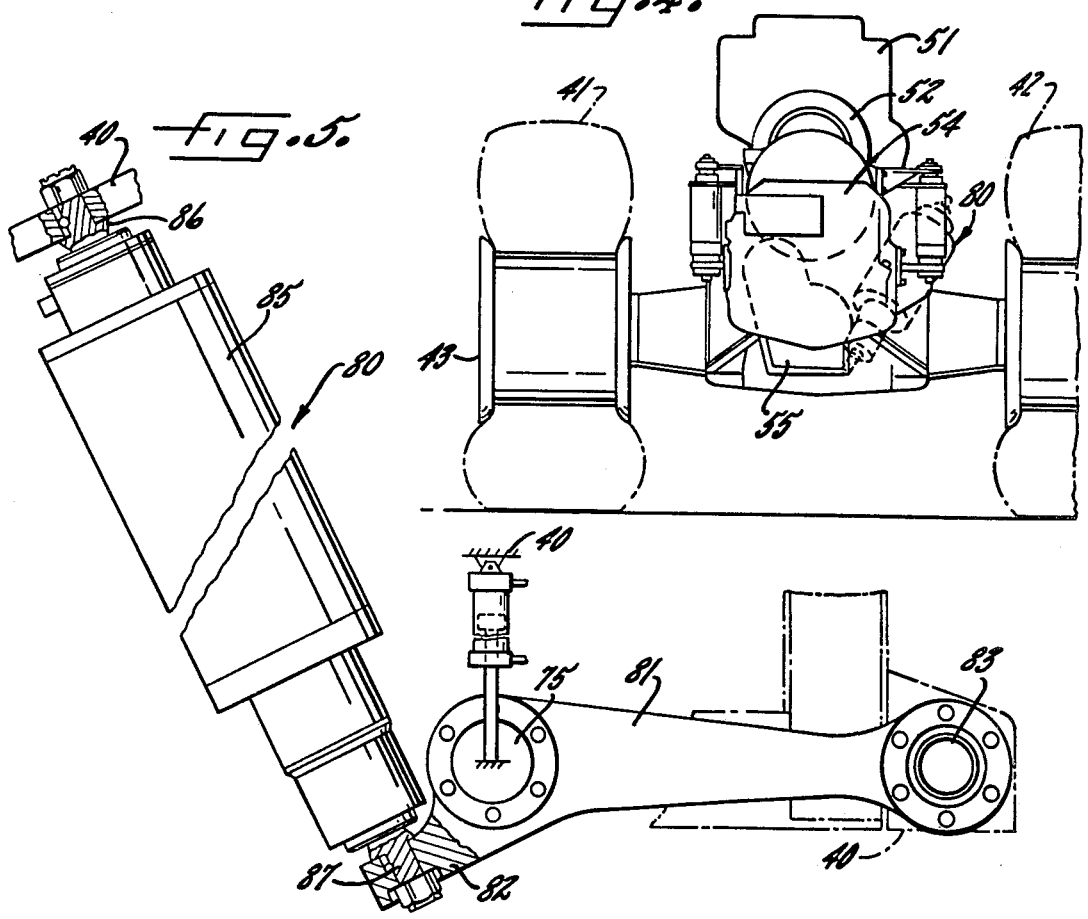

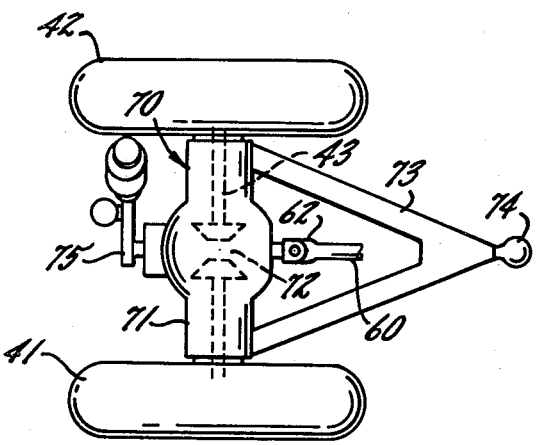
Fig. 6.
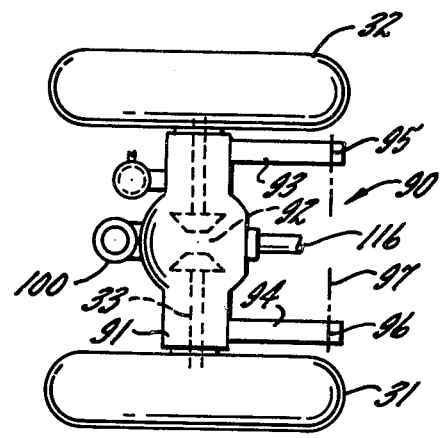
Fig. 7.
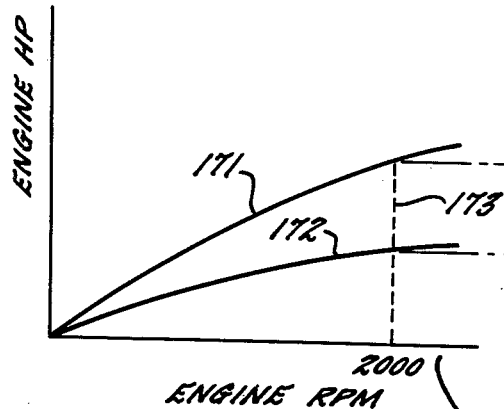
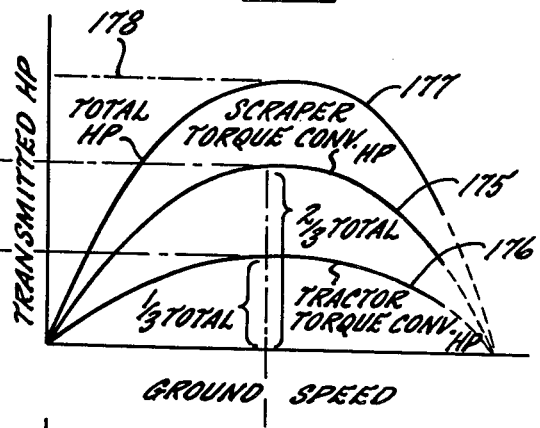
Fig. 9.
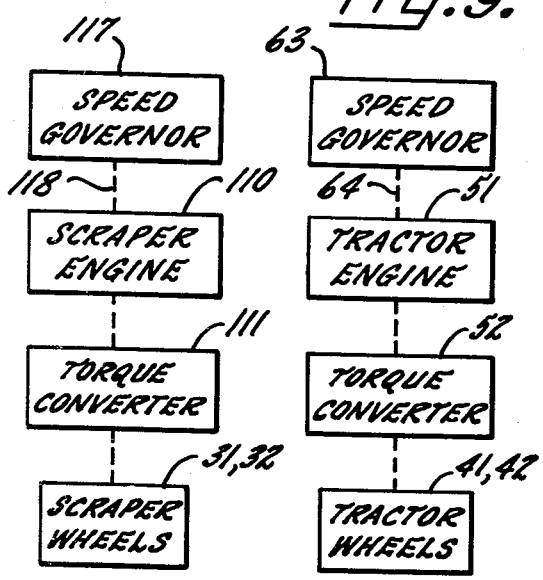
Fig. 8.
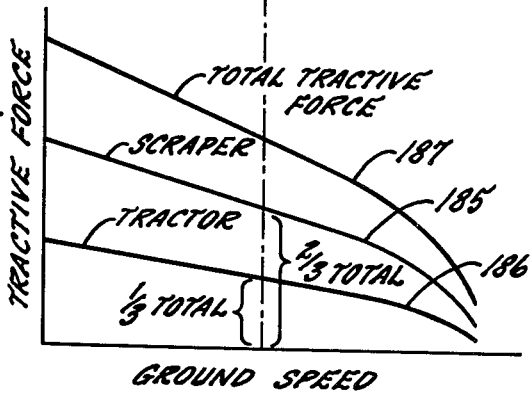
NOTE: MAXIMUM HORSEPOWER RATINGS OF TORQUE CONVERTERS 52, 111 ARE IN RATIO OF 1:2 TO ONE ANOTHER

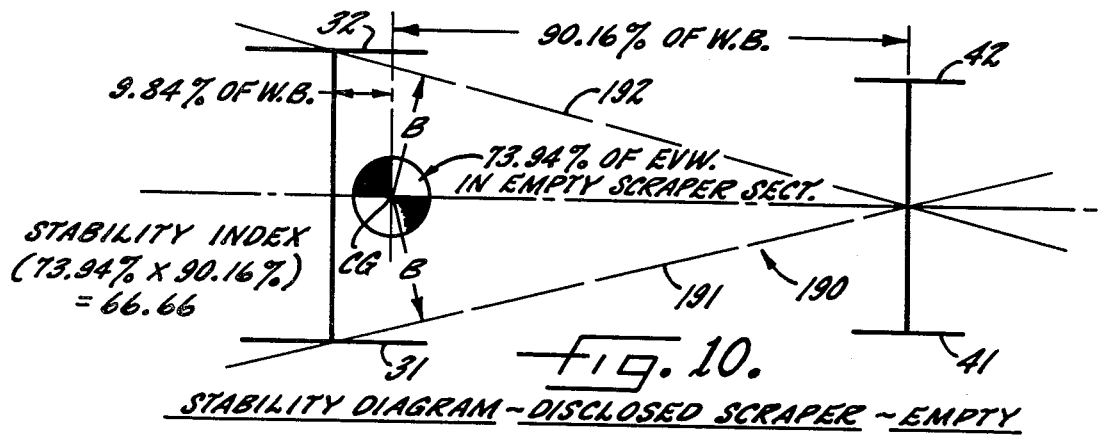
Fig. 10. STABILITY DIAGRAM ~ DISCLOSED SCRAPER ~ EMPTY
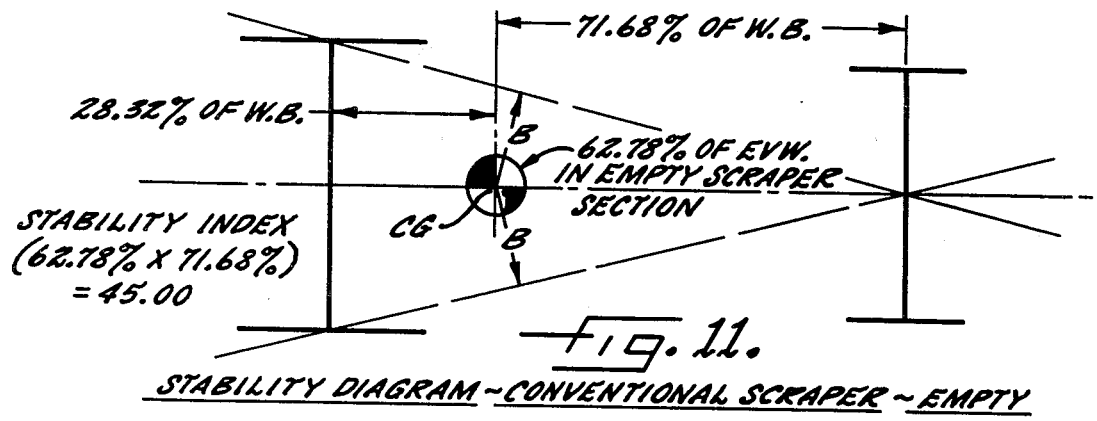
Fig. 11. STABILITY DIAGRAM ~ CONVENTIONAL SCRAPER ~ EMPTY
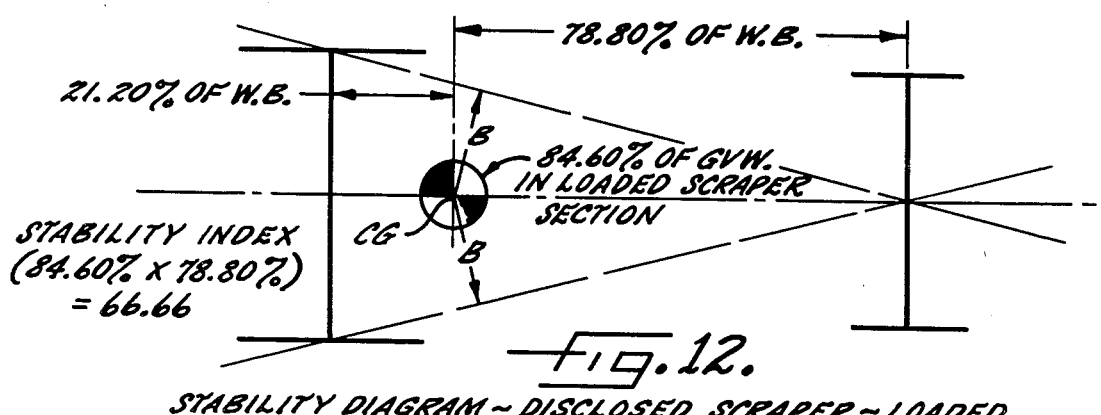
Fig. 12. STABILITY DIAGRAM ~ DISCLOSED SCRAPER ~ LOADED
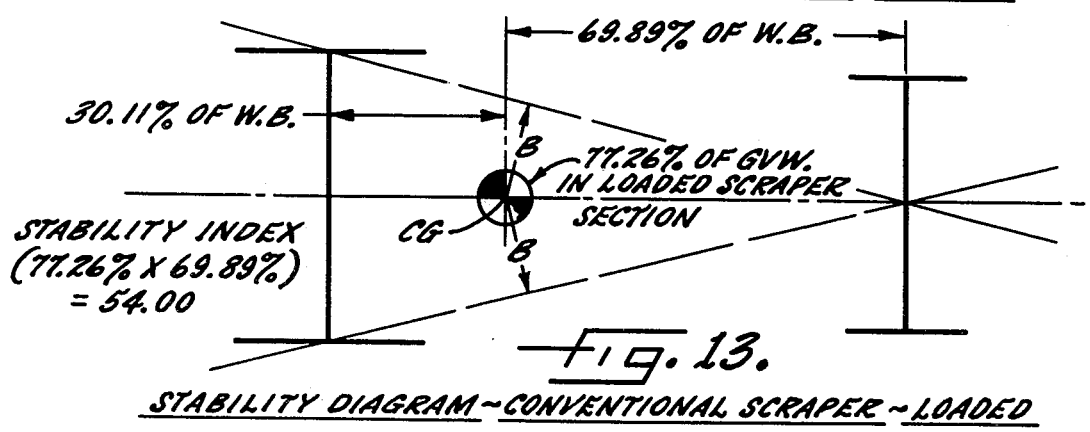
Fig. 13. STABILITY DIAGRAM ~ CONVENTIONAL SCRAPER ~ LOADED

TWO ENGINE FOUR-WHEEL DRIVE SCRAPER WITH MAIN PROPULSION AT REAR AXLE

BACKGROUND OF THE INVENTION

It has been a practice in the past, in powering a two-axle, four-wheel drive earth-moving scraper, to provide engines close-coupled to the respective axles, using a larger engine in the forward position. This has been true of both push-loaded scrapers and elevator type scrapers. Further it has been conventional to employ articulated or wagon type steering at the front axle, with maximum steering angles of approximately 90 degrees to either right or left and with transverse oscillation of a front axle and cab through a range of about 20 degrees each way from level. Because of the concentration of power at the front axle, large front tires have been necessary. This has required the gooseneck of the draft frame to be arched high enough to clear the tires for any combination of steering angle and oscillation. Moreover, because of the large tires, it has been necessary to place the bowl of the scraper sufficiently to the rear of the front tires to insure clearance under all conditions. Because of the necessary clearance geometry and concentration of power in the tractor, prior tractors have been relatively large and heavy, having a height significantly greater than the height of the scraper section.

The use of a large engine in the tractor immediately adjacent to, and often somewhat ahead of, the operator's position makes his environment less than ideal. Noise and vibration as well as heat and fumes all tend to be at a high level, arising not only from the engine but from its ancillaries such as radiator and exhaust system. Forward driving visibility is reduced. The large front tires place the operator at a greater height above the ground which aggravates the severe rolling experienced by the operator as he oscillates transversely, along with the front axle, over rough terrain.

In addition the use of a large tractor section at the front of the vehicle tends to make the vehicle unstable, particularly at steering angles near the maximum where the rear wheels are the only major stabilizing means which must be relied upon to balance the front axle forces. Such instability is particularly great when the vehicle travels empty, and often at high speed, back to pick up a new load. Following prior practices there is considerable risk of overturning when traversing rough terrain.

Prior practices can, in addition, be shown to be economically disadvantageous. Constructing a tractor having high power capability with large tires and resulting large values of clearance geometry require all load-carrying elements to be of similar scale. The gooseneck and draft frame must not only be capable of withstanding a heavy load, but, because of the required increased span, such elements must be capable of accommodating loading applied at increased moment arms, which requires still further reinforcement. The resulting increase in weight necessary in the empty vehicle subtracts from the rated load capability within the gross weight capability of the vehicle, so that operating cost per delivered cubic yard is increased. In addition the dynamic stresses imposed upon both the operator and the vehicle tend to reduce operating speed and scraper productivity.

Closely related to the above is the fact that prior techniques result in poor "cubics," that is, the volume of earth which can be moved measured as a fraction of the volume occupied by the vehicle itself. This is due to the size and height of the tractor as compared to the size and height of the scraper bowl, which is not only a disadvantage during operation but also during shipment, storage and shop maintenance.

It has been suggested in the past that the rear axle might be driven electrically. This has been found to be disadvantageous, however, because of low efficiency and since induction motors providing only a single speed approximately in low gear at the front drive have not offered good vehicle performance at higher speed. Efforts to improve performance by providing for a second motor speed has been at the expense of considerable investment in switchgear, with reduced reliability due to that switchgear. Even so, the motor has been required to operate a good deal of the time under conditions of high slippage, resulting in overheating and possible damage. These problems are aggravated in climbing a grade due to the weight shift from the front axle to the rear of the vehicle.

Efforts have also been made to provide electrical propulsion in the driving of all four wheels, but this has been found to be disadvantageous since electrical propulsion systems have tended to be larger, heavier and more costly than mechanical drives. Moreover, electrical propulsion systems tend to be limited in the speed and torque ranges over which they can transmit full horsepower, and because of the reduced efficiency inherent in an electric drive, total availability propulsion horsepower is reduced.

The above comments apply to scrapers in general. In the case of elevator type scrapers, power being provided from the front engine, difficulty has been experienced in coordinating elevator speed and performance with the propulsion speed and tractive effort, to keep the elevator from being overloaded and to avoid spinning and rapid wear of tires while maintaining reason efficiency.

SUMMARY AND OBJECTS OF THE INVENTION

It is, accordingly, an object of the present invention to provide an off-highway earth-moving vehicle of the scraper type having driven front and rear axles including a tractor section and a scraper section which are so proportioned in size and weight that the weight applied to the scraper wheels under both loaded and unloaded conditions is approximately twice the weight applied to the tractor wheels, and with the drive systems being so proportioned that the power applied to the scraper wheels is approximately twice the power applied to the tractor wheels.

It is a related object to provide, in a vehicle of the above type, a tractor section of relatively smaller size and weight in which, for a given capacity, the tires, axles, suspension, chassis, oscillation arrangement, articulated steering, gooseneck and draft frame are all scaled down in size and weight so that the front axle carries approximately one-third, and the rear axle two-thirds, of the total axle loading in both the empty and full conditions, with separate engines at the respective axles for supplying power to both axles substantially in proportion to the weight which they bear.

It is a more specific object to provide, in a vehicle of the above type, a scraper section having a first governed engine plus torque converter and a tractor section having a second governed engine plus torque converter with the torque converters having respective maximum horsepower output ratings at the governed speeds which bear a ratio to one another on the general order of 2:1.

It is still another object of the invention to provide an earth-moving vehicle of the scraper type in which a relatively small engine is used in the tractor section so that the operator's environment is greatly improved by a substantial reduction in noise, vibration, heat and fumes combined with improved forward visibility. In addition, roll disturbances for the operator are reduced because he is placed in a lower position closer to the roll center and is independent of the oscillating movement of the front axle.

It is a related and important object to provide a tractor in which the size of the front tires is at a practical minimum for a given vehicle capacity, thereby reducing the required clearance dimensions and enabling the use of a gooseneck of minimum height and span and enabling the wheel base and overall length of the vehicle to be decreased.

It is still another object of the invention to provide an off-highway earth-moving vehicle having substantially constant height with improved "cubics," that is, maximum compactness for the size of the load being transported, but in which the weight is concentrated at the rear wheels and which has substantially better stability, that is to say, margin of safety against the hazard of overturning when making a sharp turn in rough terrain, with stability being enhanced both in the empty and loaded conditions.

It is yet another object of the invention to provide an off-highway earth-moving vehicle which has a high degree of economy both in first cost and in operating cost for the amount of work accomplished. Reduction in initial cost is brought about primarily by reduction in size of the tractor elements including chassis, front axle and tires, oscillation arrangement, suspension system, articulated steering, gooseneck and draft frame, all of which elements are relatively expensive, accompanied by a scaling up in size of the rear axle, rear tires and rear engine which can be accomplished at relatively reduced cost. The scaling down in size of the tractor draft frame and gooseneck brings about a double benefit—the spans and moments are reduced, permitting a further reduction in working cross section.

Other objects and advantages of the invention will become apparent upon reading the attached detailed description and upon reference to the drawings in which:

BRIEF DESCRIPTION OF THE DRAWINGS

FIG. 1 is a general side elevation of an off-highway earth-moving vehicle of the scraper type including a tractor section and a scraper section employing the features of the present invention.

FIG. 2 is a plan view of the vehicle disclosed in FIG. 1.

FIG. 3 is an elevational view similar to FIG. 1 but limited to elements of the tractor drive train.

FIG. 4 is a front elevational view of the drive train looking along line 4—4 in FIG. 3.

FIG. 5 is a fragmentary view showing the spring suspension device for the axle assembly looking along line 5—5 in FIG. 3.

FIG. 6 is a plan view of the tractor axle assembly looking along line 6—6 in FIG. 3.

FIG. 7 is a plan view of the scraper section, axle assembly looking along line 7—7 in FIG. 1.

FIG. 8 is a block diagram showing the system in a preferred simplified form.

FIG. 9 is a set of three inter-related characteristics showing the desired relation between the maximum horsepower output ratings of the torque converters at the scraper and tractor axles, respectively.

FIG. 10 is a stability diagram for the disclosed scraper in empty condition.

FIG. 11 is a diagram similar to FIG. 10 but applicable to a conventional scraper, also in empty condition.

FIGS. 12 and 13 are diagrams corresponding to those in FIGS. 10 and 11 but for the loaded condition.

While the invention has been described in connection with certain preferred embodiments, it will be understood that we do not intend to be limited to the particular embodiments shown but intend, on the contrary, to cover the various alternative and equivalent constructions included within the spirit and scope of the appended claims.

DETAILED DESCRIPTION OF THE PREFERRED EMBODIMENT

Referring now to the drawings, there is disclosed in FIGS. 1 and 2 an off-highway vehicle in the form of a tractor drawn scraper 20 having a tractor section 21 and a bowl or scraper section 22, the sections being interconnected by a draft frame 23 providing rolling rigidity between the bowl and the tractor. The draft frame includes a so-called gooseneck 24 which is of rigid construction pivoted to the tractor assembly 25 for horizontal swinging (steering) movement and carrying a yoke tube 26 to the lateral ends of which are rigidly secured draft members 27, one on each side of the bowl.

The bowl, indicated at 30, is supported upon scraper section wheels 31, 32 on an axle 33. In the region between, and largely above, the wheels, there is a drive housing 34 containing an engine and drive train to which reference will later be made. At the front of the bowl 30 is a transversely extending digger blade 35. A pair of bowl actuators 36 are connected between the front end of the bowl and the gooseneck 24, the actuators being capable, upon elongation, of rocking the scraper section 22 downwardly about its supporting wheels so that the blade 35 is in scraping engagement with the ground. The earth which is loosened by the blade is elevated and deposited at the rear of the bowl by means of a power driven elevator 39 which is supported upon a pair of arms 37.

Turning attention to the tractor section 21, it includes a frame 40 supported by a pair of ground engaging wheels 41, 42 on an axle 43 and carrying a cab 44. The wheels 41, 42 are driven by a drive train 50 (FIG. 3) which includes an engine 51 at the rear of the tractor section, a close-coupled torque converter 52, an intermediate drive shaft 53, a transmission 54 which is located at the front of the tractor and which has a clutch housing 55 secured to its rear surface. Leading rearwardly from the clutch housing is a main drive shaft 60 a first universal joint 61 and a second universal joint 62. The engine has a governor 63 with an output 64.

In carrying out the present invention we provide a tractor axle assembly 70 (FIG. 6) having an axle housing 71 which supports the axle 43 and which is enlarged at its center to accommodate a differential mechanism 72 coupled to the rear universal joint 62. Rigidly secured to the axle housing and projecting forwardly thereof in a centered position is a tongue 73 having a pivot connection with the tractor frame 40 in the form of a ball and socket connection 74. The tongue 73, it will be noted, is divergent, or V-shaped, and extends downwardly at a slight angle, as well as rearwardly, so as to straddle the drive shaft 60. Located to the rear of the axle housing 71, and in centered position, is a second pivot connection 75, the two pivot connections defining a roll axis 76 providing relative tilting movement of the axle assembly with respect to the tractor frame. A spring suspension device 80 (see especially FIG. 5) is interposed between the tractor frame 40 and the rear pivot connection 75 on the axle assembly. The suspension includes a panhard type link having a horizontal arm 81 and a downwardly angled arm 82. The horizontal arm 81 extends from the pivot connection 75 on the axle housing to a pivot connection 83 along one side of the tractor frame 40. Interposed between the angled arm 82 of the panhard link and the tractor frame 40 is a spring in the form of an air/oil suspension device 85 having an upper connection 86 and a lower connection 87. The horizontal arm portion 81 of the panhard link serves as a radius rod to keep the axle housing 70 constantly centered with respect to the tractor while accommodating vertical movement of the axle assembly as well as rolling movement about the roll axis 76.

In contrast to the tractor section, the trailing section is supported by wheels which are non-rolling about a fore-and-aft axis. Specifically, and referring to FIGS. 1, 2 and 7, the wheels 31, 32 of the scraper section, and their axle 33, are supported upon a trailer axle assembly 90 having an axle housing 91 which is enlarged at its center to accommodate a differential 92. Extending forwardly from the axle housing and rigidly secured to it are a pair of laterally spaced tongues 93, 94 which are connected to the bowl structure at laterally spaced pivot connections 95, 96, providing up and down swinging movement of the axle assembly about a transversely extending axis 97. For springing of the wheels of the scraper section, a spring suspension device 100 is provided having an upper connection with the bowl structure and a lower connection with the axle housing 91 (FIG. 7). The wheels 31, 32 are thus free to swing upwardly and downwardly in unison with one another, with the motion cushioned by the spring suspension device 100.

The rear or "scraper" drive train includes an engine 110 (see FIG. 1) at the rear end of the scraper section connected by torque converter 111 to transfer box 112. Projecting forwardly from the latter is an intermediate drive shaft 113 which feeds a second transfer box 114 having an output 115 coupled to a rearwardly extending drive shaft 116 which drives the differential 92 (FIG. 7) previously referred to. The engine 110 is under the control of a known type of speed governor 117 to which it is coupled by a control connection 118 for maintaining a normal operating r.p.m., the engine having a maximum rated horsepower corresponding to such r.p.m. In the case of a large diesel unit the normal operating speed may be on the order of 2000 r.p.m.

Since the laterally spaced tongues 93, 94 of the scraper section axle preclude relative rolling movement of the trailer wheels about a fore-and-aft axis, the wheels are constrained to bear a constant "roll" relationship to the bowl, thereby determining the lateral tilt relationship of the scraper blade 35 with respect to the ground. Also because of the combined rolling rigidity between the scraper section wheels 31, 32 and the bowl, and the rolling rigidity between the bowl and the tractor due to the nature of the draft hitch 23, the tractor is positioned about its roll axis 76, that is to say, is positioned as to lateral tilting, in accordance with the position of the bowl. Since the bowl, particularly when filled, is weighty and relatively ponderous, it tends to resist lateral tilting or swaying movement, so that the tilting movement which is imparted to the tractor, and hence to the cab of the tractor, is minimized. Thus, the cab remains relatively stable subjecting the operator to a minimum of lateral accelerational forces while the tractor wheels are, at the same time, free to follow variations in ground contour at an unopposed and relatively rapid rate.

Achieving the ratio of 2:1 in axle loading, with two-thirds of the total weight on the rear wheels and one-third on the front, once it is recognized as a significant design criterion, is readily achieved. It is achieved, first of all, by making the tractor section components relatively light and of smaller size as already discussed. It is achieved in addition by making the scraper section components, and particularly the drive therefore, relatively heavier and in proportion to the concentration of power at the rear end of the vehicle. Beyond this, the weight distribution may be "fine tuned" by placement of the axles with respect to the remainder of the structure; moving the rear axle forwardly with respect to the scraper section and the front axle forwardly with respect to the tractor section will tend to weight the rear axle while unloading the front. By placing the bowl in appropriate relation to the axles, the payload is divided in accordance with the same 2:1 relation. One skilled in the art should, in any event, have no difficulty in achieving, at least approximately, the weight distribution characterizing the present invention.

In accordance with the present invention, the tractor section 21 and scraper section 22 are not only so proportioned in size and weight that the weight applied to the scraper wheels under the loaded and unloaded conditions is approximately twice the weight applied to the tractor wheels but the drive systems are so proportioned that the power applied to the scraper wheels is approximately twice the power applied to the tractor wheels. More specifically in accordance with the invention, the engine 110 in the scraper section is coupled to the scraper wheels by a first torque converter while the tractor engine 51 is coupled to the tractor wheels by a second torque converter, the first and second torque converters having respective maximum horsepower output ratings, at input speeds corresponding to the normal governed, r.p.m. of the respective engines, which bear a ratio to one another on the general order of 2:1.

As stated, this constitutes a reversal of the situation which generally applies to two-engine four wheel drive scrapers wherein the tractor is more highly powered than a scraper. The size and cost of the tractor portion, which performs primarily a guidance and control function, is reduced while the size of the scraper portion is increased, befitting its function as the carrier of the pay load with the power being increased in proportion to the wheel loading. Because of the reduction in tractor size and improvement in tractor geometry, the driver's job is made easier and more pleasant, with the rolling action of the tractor being reduced and highly damped. Driving efficiency is high since the driving power is concentrated at the point of concentration of the load.

As illustrated in FIG. 1, a generator, indicated at 120, is preferably sandwiched between the scraper engine 110 and the hydraulic coupling 111 for powering the elevator drive motor 160. The procedure for bringing about the desired division of horsepower may be understood by referring to the block diagram in FIG. 10 and to typical engine and torque converter characteristic curves shown in FIG. 9.

It will be assumed that in practicing the invention the scraper engine has a speed-horsepower characteristic 171 and that the tractor engine has a characteristic 172 so that substantially full rated output of each engine is obtained at a governed speed 173 which may, for example, be 2000 r.p.m. The speed-horsepower characteristics of the torque converters 111, 52 are indicated at 175, 176 respectively, both being related to ground speed, assuming 10% torque converter losses and no power consumed by the elevator motor 160. In carrying out the invention the torque converters 111, 52 are so chosen that their respective maximum horsepower output ratings at general input speed bear a ratio to one another on the general order of 2:1. It will be noted, because of the generally symmetrical shape and shallow curvature of the horsepower-ground speed curves, that the 2:1 ratio is substantially preserved over a wide range of ground speed. The envelope of total transmitted horsepower, being the sum of 175, 176, is shown at 177, having a normal maximum operating level 178.

Because the transmitted horsepower for the torque converters have both been related to ground speed, it is apparent that, short of slippage, the tractive forces produced at the wheels by the respective torque converters are in the same ratio. Referring to the plot of tractive force as a function of ground speed, it will be noted that the tractive force 185 at the scraper, added to the tractive force 186 at the tractor results in a total tractive force 187 and that the component tractive forces 185, 186 are in a 2:1 ratio over a substantial range of ground speed. It is seen then, that by using torque converters having characteristics which are in accordance with the present teachings, it is possible to achieve and automatically maintain the desired 2:1 power and traction ratio at the scraper and the tractor wheels respectively without resort to servo type control systems.

The improvement in stability brought about by the present invention, for the empty bowl condition, is well illustrated by the diagrams set forth in FIGS. 10 and 12, respectively, applicable to a prototype design utilizing the invention as compared to a more conventional design. There is shown, at 190 in FIG. 10, the plan view of a typical inventive scraper of practical design having base or "tipping" lines 191, 192, respectively, and with a center of gravity CG, where 73.94 percent of the empty vehicle weight is concentrated at a point corresponding to 90.16 percent of wheel base. Multiplying the two figures together gives a stability index of 66.66. Such stability index has significance since the stability depends upon two factors, the total amount of weight and the point at which it is applied. The point of application should preferably be far to the rear, thereby increasing the dimension B, which is the amount that the center of gravity must laterally shift in order to provide a net overturning moment about a tipping line.

Referring next to FIG. 11 which indicates a more conventional weight distribution, 62.78 percent of the empty vehicle weight is concentrated at CG, a point which is located at only 71.68 percent of the wheel base resulting in less hold-down force combined with a substantially reduced dimension B which, upon being exceeded, results in overturning. The two percentages, when multiplied together, produce a stability index of only 45.00.

Turning next to FIG. 12 which shows an equivalent diagram for the disclosed scraper loaded condition, 84.60 percent of the loaded vehicle weight is applied at a point which is 78.80 percent of the wheel base, resulting in a stability index of 66.66, substantially the same as before. Comparing this with a more conventional loaded vehicle as shown in FIG. 13 where 77.26 percent of the loaded vehicle weight is applied at a point which is 69.89 percent of the wheel base a stability index of 54.00 is produced which, although an improvement upon the empty condition, is still substantially less than the stability achieved by the invention. Indeed, it is the relative improvement under the empty condition which is the more significant in view of the tendency of an operator to traverse rougher ground at high speed in the unloaded condition.

While we have found that two-thirds of the weight and power should be concentrated at the rear axle with one one-third at the front, it will be apparent to one skilled in the art that it is possible to achieve the main benefits of the invention within a permissible range on each side of the optimum condition. Thus, it has been found that the weight and power at the rear axle may, within the scope of the invention, vary between, say, 60 and 72 percent of the total weight and power and the weight and power applied at the front axle may range between, say 40 and 28 percent of the total weight and power.

It will be apparent that the advantages of the invention have been fully realized: Because of the use of an engine in the tractor which has only one-half of the horsepower of the engine in the tractor—even less if elevator power is taken into account—, elements of the tractor may be appropriately down-sized resulting not only in improved geometry but a shifting of the load, in proportion to power, to the rear wheels. Control is highly simplified since with both of the engines 51, 110 operating at their governed speed, and using the specified torque converters, the 2:1 power ration is automatically achieved and maintained. The operator's environment is substantially improved because of the use of the smaller engine in the tractor position, with a corresponding reduction in noise, vibration and fumes. Visibility is improved and rolling discomfort is greatly alleviated.

What we claim is:

1. In an off-highway earth-moving vehicle of the scraper type, the combination comprising, a tractor section and a scraper section, the scraper section having a scraper blade and a bowl, each section having a pair of ground-engaging wheels, a draft frame providing rolling rigidity interposed between the sections, the tractor section having an axle assembly mounting the associated wheels and which is floatingly supported with respect to the tractor section to permit independent movement of the assembly in the following of ground contours, the sections of the vehicle being so proportioned in size and weight that the weight applied to the scraper wheels under both loaded and unloaded conditions is approximately twice the weight applied to the tractor wheels, a first engine in the scraper section having a first torque converter coupled to the scraper wheels, a second engine in the tractor section having a second torque converter coupled to the tractor wheels, means for governing each engine for operation at a normal operating r.p.m., the first and second torque converters having respective maximum horsepower output ratings, at input speeds corresponding to normal governed operating r.p.m., of the respective engines, which bear a ratio to one another on the general order of 2:1.

2. The combination as claimed in claim 1 in which the weight and power applied to the scraper wheels range between 60 and 72 percent of the total weight and power, and the weight and power applied to the tractor wheels range between 40 and 28 percent of the total weight and power.

* * * * *